(12) United States Patent
Pang et al.

(10) Patent No.: US 11,184,804 B2
(45) Date of Patent: Nov. 23, 2021

(54) DATA TRANSMISSION METHOD AND APPARATUS

(71) Applicant: HUAWEI TECHNOLOGIES CO., LTD., Guangdong (CN)

(72) Inventors: Lingli Pang, Shanghai (CN); Li Yang, London (GB); Xudong Yang, Shanghai (CN); Hongzhuo Zhang, Shanghai (CN); Wenruo Zhu, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/894,388

(22) Filed: Jun. 5, 2020

(65) Prior Publication Data

US 2020/0305026 A1    Sep. 24, 2020

Related U.S. Application Data

(63) Continuation of application No. PCT/CN2018/119626, filed on Dec. 6, 2018.

(30) Foreign Application Priority Data

Dec. 8, 2017    (CN) .......................... 201711290539.5

(51) Int. Cl.
*H04W 28/12* (2009.01)
*H04W 28/06* (2009.01)

(52) U.S. Cl.
CPC ........... *H04W 28/12* (2013.01); *H04W 28/06* (2013.01)

(58) Field of Classification Search
CPC . H04W 28/06; H04W 28/12; H04W 28/0215; H04L 1/00; H04L 1/06; H04L 47/283; H04B 7/26; H04B 7/15
See application file for complete search history.

(56) References Cited

U.S. PATENT DOCUMENTS

2007/0091863 A1    4/2007    Sampath et al.
2008/0279155 A1    11/2008    Pratt, Jr. et al.
(Continued)

FOREIGN PATENT DOCUMENTS

CN            101166073 A        4/2008
CN            101331709 A        12/2008
(Continued)

OTHER PUBLICATIONS

3GPP TS 23.203 V15.0.0 (Sep. 2017),3rd Generation Partnership Project,Technical Specification Group Services and System Aspects, Policy and Charging Control Architecture (Release 15), 257 pages.
(Continued)

*Primary Examiner* — Syed Ali
(74) *Attorney, Agent, or Firm* — Fish & Richardson P.C.

(57) ABSTRACT

This application provides a data transmission method and apparatus. The method includes: receiving, by a first network node, first indication information sent by a second network node, where the first indication information is used by the first network node to determine first duration, and the first duration is duration from receiving a first data packet by the first network node to sending the first data packet by the first network node; and sending, by the first network node, the first data packet based on the first indication information. The data transmission method and apparatus provided in embodiments of this application help ensure that a communications network transmits a data packet based on a duration requirement.

16 Claims, 4 Drawing Sheets

(56) References Cited

U.S. PATENT DOCUMENTS

| | | | |
|---|---|---|---|
| 2012/0120808 A1 | 5/2012 | Nandagopal et al. | |
| 2012/0163191 A1 | 6/2012 | Tokimizu et al. | |
| 2014/0286229 A1 | 9/2014 | Folkmanis et al. | |
| 2019/0110315 A1* | 4/2019 | Park | H04W 84/12 |

FOREIGN PATENT DOCUMENTS

| | | |
|---|---|---|
| CN | 101931884 A | 12/2010 |
| CN | 104170461 A | 11/2014 |
| CN | 106817426 A | 6/2017 |
| EP | 1940089 A1 | 7/2008 |
| EP | 2760182 A1 | 7/2014 |
| WO | 2012044129 A2 | 4/2012 |

OTHER PUBLICATIONS

PCT International Search Report and Written Opinion in International Application No. PCT/CN2018/119,626, dated Feb. 27, 2019, 15 pages (With English Translation).

Extended European Search Report issued in European Application No. 18886360.9 dated Nov. 12, 2020, 12 pages.

Office Action issued in Chinese Application No. 201711290539.5 dated Feb. 23, 2021, 9 pages.

EPO Communication pursuant to Article 94(3) EPC issued in European Application No. 18/886,360 9 dated Sep. 14, 2021, 14 pages.

\* cited by examiner

DATA TRANSMISSION METHOD AND APPARATUS

CROSS-REFERENCE TO RELATED APPLICATIONS

This application is a continuation of International Application No. PCT/CN2018/119626, filed on Dec. 6, 2018, which claims priority to Chinese Patent Application No. 201711290539.5, filed on Dec. 8, 2017. The disclosures of the aforementioned applications are hereby incorporated by reference in their entireties.

TECHNICAL FIELD

This application relates to the communications field, and more specifically, to a data transmission method and apparatus in the communications field.

BACKGROUND

With continuous development of communications technologies, a wireless communications network, especially a cellular network, is used to carry a data packet. This can simplify a network topology, reduce network deployment overheads, support a scenario in which a device moves, and so on, and therefore is widely applied in many fields. When the wireless communications network carries a data packet that has a relatively high requirement for transmission duration, each network node responsible for transmitting the data packet in the wireless communications network needs to provide a transmission service that can meet the duration requirement.

Therefore, a technical solution needs to be provided to ensure that a communications network transmits a data packet based on a duration requirement.

SUMMARY

This application provides a data transmission method and apparatus, to help ensure that a communications network transmits a data packet based on a duration requirement.

According to a first aspect, an embodiment of this application provides a data transmission method. The method includes:

receiving, by a first network node, first indication information sent by a second network node, where the first indication information is used by the first network node to determine first duration, and the first duration is duration from receiving a first data packet by the first network node to sending the first data packet by the first network node; and sending, by the first network node, the first data packet based on the first indication information.

According to the data transmission method provided in this embodiment of this application, the first network node in a communications network sends the first data packet based on the first duration in the first indication information. This helps ensure that the communications network transmits the first data packet based on a duration requirement.

In a possible implementation, before the receiving, by a first network node, first indication information sent by a second network node, the method further includes: obtaining, by the first network node, deterministic transmission indication information, where the deterministic transmission indication information is used to indicate deterministic transmission performed on a first data flow by the first network node, that is, indicate that the first network node transmits a data packet in the first data flow based on a requirement of the first duration, and the first data flow includes the first data packet. Correspondingly, S230 may be: sending, by the first network node, the first data packet based on the first duration and the deterministic transmission indication information.

It should be understood that, because the communications network has a relatively high delay requirement of the first data packet, if the first data packet is transmitted based on the duration requirement indicated by the second network node, the first data packet may be invalid or expired.

Optionally, when the first network node determines that the first data packet cannot be sent within the first duration requirement, the first network node may discard the first data packet, or the first network node may indicate, to the second network node, duration that is supported by the first network node and that is from receiving the first data packet to sending the first data packet, indicate that transmission is unsuccessful, and so on. This is not limited in this embodiment of this application.

In a possible implementation, the first data packet is the data packet in the first data flow, and the first indication information includes an identifier of the first data flow.

It should be understood that a data flow in this embodiment of this application is a data packet set including one or at least two data packets, and is a logical concept. Data packets belonging to a same data flow have a same or similar feature.

Optionally, data packets having a same transmit end and a receive end, for example, data packets having a same internet protocol (IP) address, or data packets having a same or similar transmission duration requirement, or data packets having a same identifier of the data flow, may belong to one data flow.

Optionally, the identifier of the data flow may be an identifier of a bearer in which the data flow is located, an identifier of a transmit end and/or a receive end of the data flow, an identifier of a terminal device, an identifier that is allocated to the data flow in the communications network and that is used to distinguish the data flow in the communications network, or the like. This is not limited in this embodiment of this application.

According to the data transmission method provided in this embodiment of this application, the deterministic transmission indication information includes the identifier of the data flow, so that when the communications network has a plurality of data flows that have different transmission duration requirements, the first network node can distinguish between different data flows, and ensure that the communications network transmits a data packet in each data flow based on a duration requirement of each data flow.

In a possible implementation, the first indication information includes value information of the first duration.

Optionally, the sending, by the first network node, the first data packet based on the first indication information may be: determining, by the first network node, the first duration based on the first indication information; and sending, by the first network node, the first data packet based on the first duration.

In a possible implementation, the first indication information includes value information of second duration, the second duration is duration from receiving the first data packet by a third network node to sending the first data packet by a fourth network node, the third network node is a network node that first transmits the first data packet in the communications network, the fourth network node is a network node that last transmits the first data packet in the communications network, and the communications network includes the first network node and the second network node; and before the sending, by the first network node, the first data packet based on the first indication information, the method further includes: obtaining, by the first network node, a first time parameter, where the first time parameter indicates a first moment or third duration, the first moment is a moment at which the third network node receives the first data packet, and the third duration is duration from receiving the first data packet by the third network node to receiving the first data packet by the first network node; and the sending, by the first network node, the first data packet based on the first indication information includes: sending, by the first network node, the first data packet based on the first indication information and the first time parameter.

Optionally, the sending, by the first network node, the first data packet based on the first indication information and the first time parameter may be: determining, by the first network node, the first duration based on the second duration and the first time parameter; and sending, by the first network node, the first data packet based on the first duration.

In a possible implementation, the first indication information includes value information of fourth duration, and the fourth duration is duration from receiving the first data packet by the first network node to sending the first data packet by the fourth network node.

Optionally, the sending, by the first network node, the first data packet based on the first indication information may be: determining, by the first network node, the first duration based on the fourth duration; and sending, by the first network node, the first data packet based on the first duration.

In a possible implementation, the obtaining, by the first network node, a first time parameter includes: obtaining, by the first network node, the first time parameter carried in the first data packet; or receiving, by the first network node, second indication information, where the second indication information includes the first time parameter; and obtaining, by the first network node, the first time parameter from the second indication information.

In a possible implementation, the first data flow includes at least two data packets transmitted at a first transmission period, the at least two data packets include the first data packet, and the first indication information further includes information about the first transmission period.

In a possible implementation, when the first time parameter indicates the first moment, the obtaining, by the first network node, a first time parameter includes: obtaining, by the first network node, a second time parameter, where the second time parameter indicates a second moment, the second moment is a moment at which the third network node receives a second data packet, and the second data packet is the first transmitted data packet in the at least two data packets; and determining, by the first network node, the first time parameter based on the second moment and the first transmission period.

In a possible implementation, the first data packet is the data packet in the first data flow, and before the sending, by the first network node, the first data packet based on the first indication information, the method further includes: obtaining, by the first network node, a transmission parameter used when the data packet in the first data flow is transmitted, where the transmission parameter includes at least one activation identifier, at least one type of transmission periods activated by the at least one activation identifier, and an identifier of a data packet sent at each of the at least one type of transmission periods, and the at least one type of transmission periods includes the first transmission period; and the sending, by the first network node, the first data packet based on the first indication information includes: sending, by the first network node, the first data packet based on the first indication information and the transmission parameter.

Optionally, the transmission parameter may further include information about a time-frequency resource used by the data packet sent at each type of transmission periods and/or information about a modulation and coding scheme (MCS) of the data packet sent at each type of transmission periods.

Optionally, when there are a plurality of types of quantities of the at least one type of transmission periods, and a sending time point of a second data packet sent by using a second transmission period overlaps a sending time point of a third data packet sent by using a third transmission period (that is, a time-frequency resource of the second data packet collides with a time-frequency resource of the third data packet), the transmission parameter may further include information about a target time-frequency resource used to transmit the second data packet and the third data packet and/or information about a target MCS used to transmit the second data packet and the third data packet. The second transmission period and the third transmission period are any two types of a plurality of types of transmission periods. This is not limited in this embodiment of this application.

According to the data transmission method provided in this embodiment of this application, the first network node may learn of, based on the transmission parameter, a type of transmission periods or types of transmission periods that are activated, data packets that are transmitted at each type of activated transmission periods, and a time-frequency resource and an MCS that are used to transmit these data packets. Therefore, the first network node does not need to request scheduling information from the second network node when sending each data packet, thereby reducing signaling overheads.

In a possible implementation, the method further includes: reporting, by the first network node, transmission capability information to the second network node, where the transmission capability information includes at least one of a data transmission volume supported by the first network node, a transmission rate supported by the first network node, transmission reliability supported by the first network node, and duration that is supported by the first network node and that is from receiving the first data packet by the first network node to sending the first data packet by the first network node.

According to the data transmission method provided in this embodiment of this application, the second network node may determine the first indication information with reference to the transmission capability information reported by the first network node. This can avoid a case in which the communications network cannot transmit a data packet based on a duration requirement because a transmission capability of the first network node cannot meet the duration requirement indicated by the second network node.

In a possible implementation, the first indication information includes at least one of a duration threshold and a duration jitter.

In other words, the first network node may send the first data packet within an allowable duration threshold range of the first duration, or within an allowable duration jitter range of the first duration.

In other words, the first network node may send the first data packet within an allowable duration threshold range of the second duration, or within an allowable duration jitter range of the second duration.

According to a second aspect, this application provides a data transmission method. The method includes:

determining, by a second network node, first indication information, where the first indication information is used to determine first duration, and the first duration is duration from receiving a first data packet by a first network node to sending the first data packet by the first network node; and sending, by the second network node, the first indication information to the first network node.

In a possible implementation, the method further includes: receiving, by the second network node, transmission capability information reported by the first network node, where the transmission capability information includes at least one of a data transmission volume supported by the first network node, a transmission rate supported by the first network node, transmission reliability supported by the first network node, and duration that is supported by the first network node and that is from receiving the first data packet by the first network node to sending the first data packet by the first network node; and the determining, by a second network node, first indication information of the first network node includes: determining, by the second network node, the first indication information based on the transmission capability information.

According to a third aspect, this application provides a data transmission apparatus, configured to perform the method according to any one of the first aspect or the possible implementations of the first aspect.

According to a fourth aspect, this application provides a data transmission apparatus, configured to perform the method according to any one of the second aspect or the possible implementations of the second aspect.

According to a fifth aspect, this application provides a data transmission apparatus. The apparatus includes a memory, a processor, a transceiver, and an instruction that is stored in the memory and that can be run on the processor. The memory, the processor, and the communications interface communicate with each other by using an internal connection path. The processor executes the instruction, so that the apparatus implements the method according to any one of the first aspect or the possible implementations of the first aspect.

According to a sixth aspect, this application provides a data transmission apparatus. The apparatus includes a memory, a processor, a transceiver, and an instruction that is stored in the memory and that can be run on the processor. The memory, the processor, and the communications interface communicate with each other by using an internal connection path. The processor executes the instruction, so that the apparatus implements the method according to any one of the second aspect or the possible implementations of the second aspect.

According to a seventh aspect, this application provides a computer-readable medium, configured to store a computer program. The computer program includes an instruction used to implement the method according to any one of the first aspect or the possible implementations of the first aspect.

According to an eighth aspect, this application provides a computer-readable medium, configured to store a computer program. The computer program includes an instruction used to implement the method according to any one of the second aspect or the possible implementations of the second aspect.

According to a ninth aspect, this application provides a computer program product including an instruction. When the instruction is run on a computer, the computer is enabled to implement the method according to any one of the first aspect or the possible implementations of the first aspect.

According to a tenth aspect, this application provides a computer program product including an instruction. When the instruction is run on a computer, the computer is enabled to implement the method according to any one of the second aspect or the possible implementations of the second aspect.

According to an eleventh aspect, this application provides a chip apparatus, including an input interface, an output interface, at least one processor, and a memory, where the input interface, the output interface, the processor, and the memory communicate with each other by using an internal connection path, the processor is configured to execute code in the memory, and when the processor executes the code, the chip apparatus implements the method according to any one of the first aspect or the possible implementations of the first aspect.

According to a twelfth aspect, this application provides a chip apparatus, including an input interface, an output interface, at least one processor, and a memory, where the input interface, the output interface, the processor, and the memory communicate with each other by using an internal connection path, the processor is configured to execute code in the memory, and when the processor executes the code, the chip apparatus implements the method according to any one of the second aspect or the possible implementations of the second aspect.

DESCRIPTION OF EMBODIMENTS

The following describes technical solutions of this application with reference to accompanying drawings.

Figure 1:
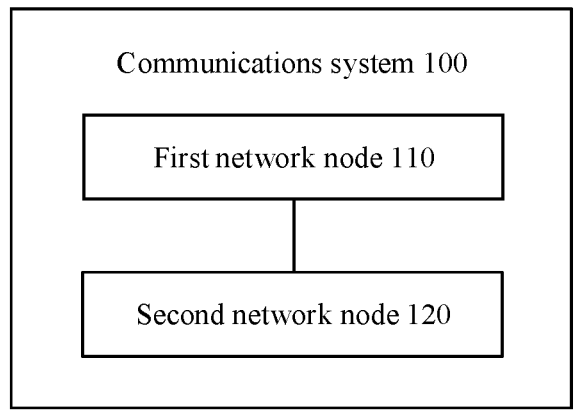
FIG. 1 is a schematic block diagram of a communications network according to an embodiment of this application.

FIG. 1 is a schematic block diagram of a communications network 100 according to an embodiment of this application. As shown in FIG. 1, the communications network 100 includes at least one first network node (a first network node 110 shown in FIG. 1) and at least one second network node (a second network node 120 shown in FIG. 1).

Optionally, the communications network in this embodiment of this application may be a wireless communications network, and specifically, may be a wireless cellular network. However, this embodiment of this application is not limited thereto.

The first network node 110 is configured to transmit/route a data packet.

The second network node 120 is configured to control the first network node to transmit/route the data packet, for example, collect duration for processing the data packet by the first network node in a data packet transmission/routing process, and configure the duration for processing the data packet by the first network node. Optionally, the second network node may be further configured to transmit/route the data packet.

It should be understood that in the communications network, one second network node may control one or more first network nodes to transmit/route the data packet. This is not limited in this embodiment of this application.

Optionally, the communications network may further include another entity that can transmit/route the data packet. This is not limited in this embodiment of this application.

Optionally, the first network node in this embodiment of this application may transmit the data packet in an uplink direction, or may transmit the data packet in a downlink direction. The uplink direction is a direction in which a terminal device sends a data packet to a network side device, and the downlink direction is a direction in which the network side device sends a data packet to the terminal device. This is not limited in this embodiment of this application.

The following describes the communications network in this embodiment of this application by using a cellular network as an example.

Optionally, a data packet generation apparatus generates the data packet, and sends the data packet to a third network node in the communications network. The data packet arrives at a fourth network node in the communications network after being transmitted by each intermediate network node responsible for transmitting/routing the data packet in the communications network. The fourth network node in the communications network sends the data packet to another network node in another communications network. The fourth network node is a network node in a bottom-layer communications network, and the another network node is a network node in a higher-layer application network.

It should be understood that, in this embodiment of this application, when the communications network includes two first network nodes, a first network node that first transmits the data packet is referred to as a third network node, and a first network node that last transmits the data packet is referred to as a fourth network node. When the communications network includes more than two first network nodes, a first network node that first transmits the data packet is referred to as a third network node, a first network node that last transmits the data packet is referred to as a fourth network node, and a first network node that transmits the data packet between the third network node and the fourth network node is referred to as an intermediate network node.

It should be further understood that the communications network is a network used for data packet transmission/routing, and does not include a service data packet generation node and a service data packet parsing node, for example, a PLC in an industrial scenario and a network node in a high-layer application network.

Optionally, when the fourth network node is a terminal device, the terminal device may be logically divided into a bottom-layer communications module (or referred to as a cellular module) and a high-layer industrial application module. The fourth network node may be understood as the communications module of the terminal device, and the another network node may be understood as the industrial application module of the terminal device.

Optionally, in a scenario in which the data packet is transmitted in an uplink direction, the data packet generation apparatus may be an industrial application module of UE. In a scenario in which the data packet is transmitted in a downlink direction, the data packet generation apparatus may be a factory control device or an industrial input/output device, for example, a programmable logic controller (PLC). This is not limited in this embodiment of this application.

Optionally, in this embodiment of this application, a bottom layer may include at least one of a physical (PHY) layer, a MAC layer, an RLC layer, a PDCP layer, or an SDAP layer; and a high layer may include at least one of a transport layer, an application layer, a PDCP layer, an SDAP layer, or an Ethernet data link layer. This is not limited in this embodiment of this application.

Optionally, the communications network may alternatively be an industrial transmission network including a cellular network. A network node that first transmits the data packet in the communications network is a network node that generates the data packet, and a network node that last transmits the data packet in the communications network is a receive end of the data packet. The network node that generates the data packet transmits the data packet to the receive end of the data packet through the cellular network. This is not limited in this embodiment of this application.

It should be understood that, the technical solutions of this embodiment of this application may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access ( ) communications system, a wireless local area network (WLAN), a future fifth generation (5G) wireless communications system, or various evolved systems of subsequent wireless transmission.

Optionally, the first network node and/or the second network node may alternatively be entities that can implement a specific network function. This is not limited in this embodiment of this application.

The following describes the first network node and the second network node in the communications network by using a 5G communications system as an example. However, this embodiment of this application is not limited thereto.

Optionally, the first network node may be user equipment (UE), an access network (AN) device, a user plane function (UPF), or the like. This is not limited in this embodiment of this application.

Optionally, the second network node may be an AN, an access and mobility management function (AMF), a session management function (SMF), an authentication server function (AUSF), a unified data management ((UDM), a packet control function block (PCF), or the like; or the second network node may be a centralized user configuration (CUC) node, a centralized user configuration (CNC) node, or the like. This is not limited in this embodiment of this application.

For example, in the communications network, the UE, the AN, and the UPF are first network nodes, and the AMF is a second network node. The AMF controls the UE, the AN, and the UPF to transmit/route a data packet.

For another example, in the communications network, the UE and the AN are first network nodes, and the AMF and the SMF are second network nodes. The AMF controls the UE to transmit/route a data packet, and the SMF controls the AN to transmit/route a data packet.

For another example, in the communications network, the UE is a first network node, and the AN is a second network node. The AN controls the UE to transmit/route a data packet, and the AN may be further responsible for jointly completing data packet transmission/routing with the UE.

For another example, in the communications network, first UE is a first network node, and second UE is a second network node. The two UEs directly complete communication, that is, one of the two UEs (referred to as primary UE) controls the other one of the two UEs (referred to as primary UE) to transmit/route a data packet.

The following describes main functions of network entities that may implement functions of the first network node and the second network node by using a 5G communications system as an example.

Main functions of the AN are: radio resource scheduling and management, forwarding a user plane packet to the UPF, forwarding control plane information to the AMF, session management, quality of service (QoS) flow management, mapping a QoS flow to a corresponding radio bearer, and the like.

Main functions of the UPF are: user plane packet forwarding, user plane policy rule execution, and user plane transmission QoS management.

Main functions of the AMF are: registration management, connection management, reachability management, connection management, access authentication and authorization, and SM message transmission between the UE and SMF.

Main functions of the SMF are: session management, UE IP address allocation and management, UPF selection and control, UPF traffic forwarding destination control, and policy enforcement and QoS management in control.

Main functions of the AUSF are: authentication credential processing, subscriber identity processing, access authorization, registration/mobility management, and subscription management.

The UDM includes a front end (FE) and a user data repository (UDR). The FE is responsible for credit rating processing, location management, subscription management, and the like, and can access user subscription data stored in the UDR. The UDR is a user subscription data storage server, and is responsible for providing the user subscription data to the front end.

Optionally, the first network node and/or the second network node may be entities that can implement a specific network function in a network device. This is not limited in this embodiment of this application.

In an optional embodiment, the first network node may be an entity corresponding to a transport layer in a first network device, and the second network node may be an entity corresponding to an application layer in a second network device.

Optionally, the first network device and the second network device may be the same or may be different. This is not limited in this embodiment of this application.

Optionally, the UE in this embodiment of this application may be mobile or fixed. The UE may be referred to as an access terminal, a subscriber unit, a subscriber station, a mobile station, a mobile station, a remote station, a remote terminal, a mobile device, a user terminal, a terminal, a wireless communications device, a user agent, a user apparatus, or the like. The access terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, UE in a future 5G network, an NR network, various subsequent evolved systems for wireless transmission, or the like.

Optionally, the AN in this embodiment of this application may provide communication coverage for a specific geographic area, and may communicate with UE located in the coverage. The AN may be a base transceiver station (BTS) in a GSM system or a CDMA system, may be a NodeB (NB) in a WCDMA system, may be an evolved NodeB (eNB or eNodeB) in an LTE system, or may be a radio controller in the AN. The access network device may alternatively be a device that can implement communication of the UE in a radio signal transmission manner, such as a core network, a relay station, an access point, a vehicle-mounted device, a wearable device, a future 5G network, an NR network, or an AN in various subsequent evolved systems for wireless transmission.

Optionally, in this embodiment of this application, only 5G is used as an example to describe the first network node and the second network node in the communications network. The first network node and the second network node may alternatively be network entities that can implement a same function as that in the 5G communications system and that are in another communications system (for example, GSM, CDMA, or LTE). This is not limited in this embodiment of this application.

Figure 2:
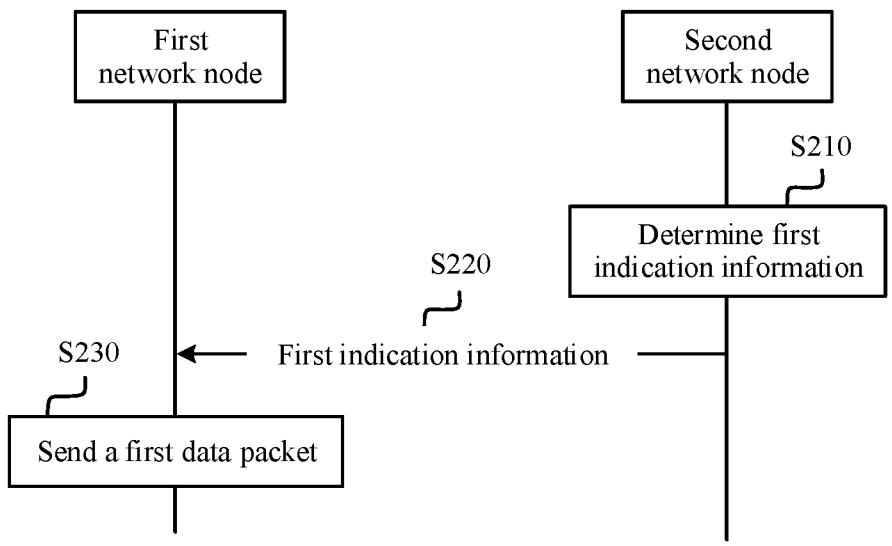
FIG. 2 is a schematic flowchart of a data transmission method according to an embodiment of this application.

FIG. 2 is a schematic flowchart of a data transmission method 200 according to an embodiment of this application. The method 200 may be applied to the communications network 100 shown in FIG. 1.

S210. A second network node determines first indication information of a first network node, where the first indication information is used by the first network node to determine first duration, and the first duration is duration from receiving a first data packet by the first network node to sending the first data packet by the first network node.

S220. The second network node sends the first indication information to the first network node, and correspondingly the first network node receives the first indication information sent by the second network node.

S230. The first network node sends the first data packet based on the first indication information.

It should be understood that when the communications network is a cellular network, the first duration may be understood as processing duration required by the first network node to process the first data packet.

Optionally, processing performed by the first network node on the first data packet may include at least one of decapsulation, encapsulation, storage, segmentation, concatenation, sorting, mapping, routing, and the like. This is not limited in this embodiment of this application.

Optionally, if the communications network includes a cellular network, for a network node that first transmits the first data packet in the communications network, the first duration may be understood as duration required by the network node that first transmits the first data packet to generate the first data packet. For a network node that last transmits the first data packet in the communications network, the first duration may be understood as duration required by the network node that last transmits the first data packet to receive the first data packet.

The following describes the technical solutions of this application by using a cellular network as an example. However, it should be understood that this embodiment of this application is not limited to being applied to a cellular network.

Figure 3:
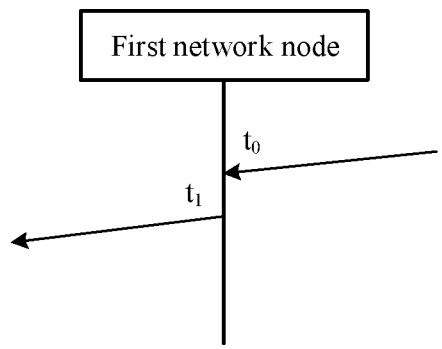
FIG. 3 is a schematic diagram of an architecture of a communications network according to an embodiment of this application.

For example, as shown in FIG. 3, $t_0$ is a moment at which the first network node receives the first data packet, and $t_1$ is a moment at which the first network node sends the first data packet. In this case, the first duration $T_1=t_1-t_0$.

Optionally, various types of duration in this embodiment of this application may be absolute duration, for example, an hour, a minute, a second, a millisecond, a microsecond, or a nanosecond. Alternatively, various types of duration in this embodiment of this application may be absolute duration represented by a time unit in the communications network. The time unit may be a frame, a subframe, a slot, a mini-slot, a symbol, or the like.

For example, if the first duration is 1 min, and the first network node receives the first data packet at 12:30:18 on Nov. 11, 2017, the first network node should send the first data packet at 12:31:18 on Nov. 11, 2017.

For another example, if the first duration is 1 frame (namely, 10 ms), and the first network node receives the first data packet at 12:30:18.010 on Nov. 11, 2017, the first network node should send the first data packet at 12:30:18.020 on Nov. 11, 2017.

Optionally, in S210, the first indication information may indicate the first duration in an explicit indication manner or an implicit indication manner. This is not limited in this embodiment of this application.

In an explicit indication manner, the first indication information may include value information of the first duration.

In an optional embodiment, the value information of the first duration may be at least one bit, and the at least one bit represents a value of the first duration.

For example, when the value information of the first duration includes four bits, "0001" indicates that the first duration is 1 ms, "0010" indicates that the first duration is 2 ms, "0011" indicates that the first duration is 3 ms, "0100" indicates that the first duration is 4 ms, and the like.

Optionally, the first network node and the second network node may agree on a time unit of the value of the first duration in advance, or the second network node configures the time unit for the first network node, or a third-party device in the communications network configures the time unit for the first network node and the second network node.

In another optional embodiment, the value information of the first duration may be at least one bit, and the at least one bit represents a number of the first duration/an index of the first duration, and the like.

Optionally, that the first network device determines the first duration based on the first indication information may be that the first network node determines the first duration based on the value information of the first duration and a first mapping relationship. The first mapping relationship is used to indicate a correspondence between the number of the first duration/the index of the first duration and the value of the first duration.

Optionally, the first network node and the second network node may learn of the first mapping relationship in a plurality of manners. This is not limited in this embodiment of this application.

Optionally, the first network node and the second network node may agree on the first mapping relationship in advance, or the second network node may configure the first mapping relationship for the first network node, or a third-party device in the communications network may configure the first mapping relationship for the first network node and the second network node.

For example, when the value information of the first duration includes two bits, "00" indicates that the first duration is 1 ms, "01" indicates that the first duration is 2 ms, "10" indicates that the first duration is 3 ms, and "11" indicates that the first duration is 4 ms.

In an implicit indication manner 1, the first indication information may include value information of second duration, and the second duration is duration from receiving the first data packet by a third network node to sending the first data packet by a fourth network node. The third network node is a first network node that first transmits the first data packet in the communications network, and the fourth network node is a network node that last transmits the first data packet in the communications network.

In an optional embodiment, the value information of the second duration may be at least one bit, and the at least one bit represents a value of the first duration.

Optionally, the first network node and the second network node may agree on a time unit of the value of the second duration in advance, or the second network node configures the time unit for the first network node, or a third-party device in the communications network configures the time unit for the first network node and the second network node.

In another optional embodiment, the value information of the second duration may be at least one bit, and the at least one bit represents a number of the first duration/an index of the first duration, and the like.

Optionally, that the first network device determines the second duration based on the first indication information may be that the first network node determines the second duration based on the value information of the second duration and a second mapping relationship. The second mapping relationship is used to indicate a correspondence between the number of the second duration/the index of the second duration and the value of the second duration.

Optionally, the first network node and the second network node may learn of the second mapping relationship in a plurality of manners. This is not limited in this embodiment of this application.

Optionally, the first network node and the second network node may agree on the second mapping relationship in advance, or the second network node may configure the second mapping relationship for the first network node, or a third-party device in the communications network may configure the second mapping relationship for the first network node and the second network node.

Optionally, before S230, the method 200 may further includes: obtaining, by the first network node, a first time parameter, where the first time parameter indicates a first moment or third duration, the first moment is a moment at which the third network node receives the first data packet, and the third duration is duration from receiving the first data packet by the third network node to receiving the first data packet by the first network node.

Correspondingly, S230 may be that the first network node sends the first data packet based on the second duration and the first time parameter.

Optionally, when the first time parameter indicates the third duration, the first network node may determine the first duration based on the third duration and the second duration. The first duration≤the second duration−the third duration.

Optionally, when the first time parameter indicates the first moment, the first network node may determine the third duration based on the first moment and a third moment, and determine the first duration based on the third duration and the second duration. The third moment is a moment at which the first network node receives the first data packet. The third duration=the third moment−the first moment, and the first duration≤the second duration−the third duration, that is, the first duration≤the second duration−(the third moment−the first moment).

In an implicit indication manner 2, the first indication information includes value information of fourth duration, and the fourth duration is duration from receiving the first data packet by the first network node to sending the first data packet by the fourth network node.

Correspondingly, the first network node may determine the first duration based on the fourth duration. The first duration≤the fourth duration.

For example, FIG. 3 shows an architecture of a communications network according to an embodiment of this application. The communications network includes only one first network node, that is, a third network node and a fourth network node in the communications network are a same first network node.

As shown in FIG. 3, a first moment is $t_0$, a third moment is $t_0$, a moment at which the fourth network node sends a first data packet is $t_1$, second duration $T_2$=third duration $T_3$=0, and fourth duration $T_4=t_1-t_0$. Therefore, first duration $T_1 \leq T_2-(t_0-t_0)=t_1-t_0$, or the first duration $T_1 \leq T_2-T_3=t_1-t_0$, or the first duration $T_1 \leq T_4=t_1-t_0$.

Figure 4:
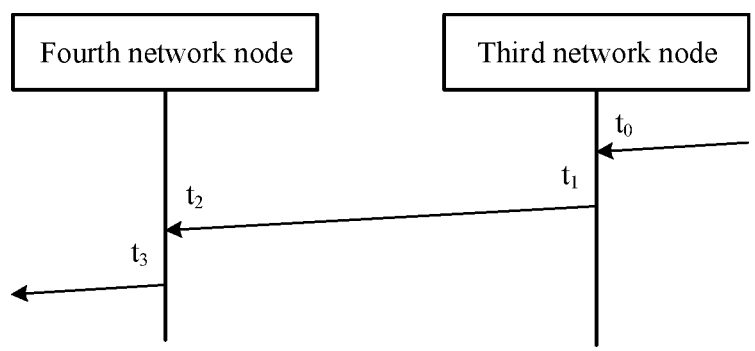
FIG. 4 is a schematic diagram of another architecture of a communications network according to an embodiment of this application.

For example, FIG. 4 shows an architecture of a communications network according to an embodiment of this application. The communications network includes two first network nodes.

It should be understood that, when the communications network includes the two first network nodes, a first network node that first transmits a first data packet is referred to as a third network node, and a first network node that last transmits the first data packet is referred to as a fourth network node.

As shown in FIG. 4, when the first network node is the third network node, a first moment is $t_0$, a third moment is $t_0$, a moment at which the fourth network node sends a first data packet is $t_3$, second duration $T_2=t_3-t_0$ the third duration $T_3$=0, and fourth duration $T_4=t_3-t_0$. Therefore, first duration $T_1 \leq T_2-(t_0-t_0)=t_3-t_0$, or the first duration $T_1 \leq T_2-T_3=t_3-t_0$, or the first duration $T_1 \leq T_4=t_3-t_0$.

As shown in FIG. 4, when the first network node is the fourth network node, a first moment is $t_0$, a third moment is $t_2$, a moment at which the fourth network node sends a first data packet is $t_3$, second duration $T_2=t_3-t_0$, third duration $T_3=t_2-t_0$, and the fourth duration $T_4=t_3-t_2$. Therefore, first duration $T_1 \leq T_2-(t_2-t_0)=t_3-t_2$, or the first duration $T_1 \leq T_2-T_3=t_3-t_2$, or the first duration $T_1 \leq T_4=t_3-t_2$.

Figure 5:
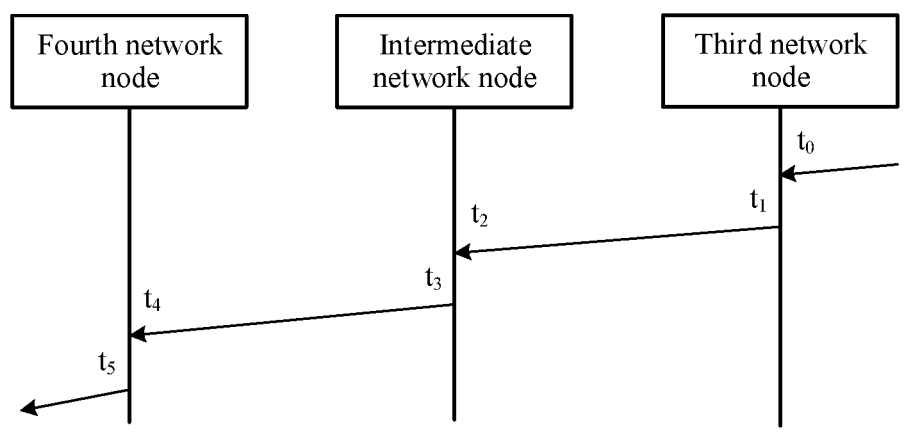
FIG. 5 is a schematic diagram of still another architecture of a communications network according to an embodiment of this application.

For example, FIG. 5 shows an architecture of a communications network according to an embodiment of this application. The communications network includes three first network nodes.

It should be understood that when the communications network includes the three first network nodes, a first network node that first transmits a first data packet is referred to as a third network node, a first network node that last transmits the first data packet is referred to as a fourth network node, and a first network node that transmits the first data packet between the third network node and the fourth network node is referred to as an intermediate network node.

As shown in FIG. 5, when the first network node is the third network node, a first moment is $t_0$, a third moment is $t_0$, a moment at which the fourth network node sends a first data packet is $t_5$, second duration $T_2=t_5-t_0$, third duration $T_3$=0, and fourth duration $T_4=t_5-t_0$. Therefore, first duration $T_1 \leq T_2-(t_0-t_0)=t_5-t_0$, or the first duration $T_1 \leq T_2-T_3=t_5-t_0$, or the first duration $T_1 \leq T_4=t_5-t_0$.

As shown in FIG. 5, when the first network node is the intermediate network node, a first moment is $t_0$, a third moment is $t_2$, a moment at which the fourth network node sends a first data packet is $t_5$, second duration $T_2=t_5-t_0$, third duration $T_3=t_2-t_0$, and fourth duration $T_4=t_5-t_2$. Therefore, first duration $T_1 \leq T_2-(t_2-t_0)=t_5-t_2$, or the first duration $T_1 \leq T_2-T_3=t_5-t_2$, or the first duration $T_1 \leq T_4=t_5-t_2$.

Optionally, the first network node may obtain transmission duration that is for transmitting the first data packet between any two first network nodes in the communications network and that is carried in first indication information, and/or processing duration supported by any first network node in the communications network.

Optionally, the first network node may learn of, in an estimation manner, the transmission duration that is for transmitting the first data packet between any two first network nodes in the communications network, and/or the processing duration supported by any first network node in the communications network.

For example, as shown in FIG. 5, the intermediate network node may learn of transmission duration $T_4=t_4-t_3$ for transmitting the first data packet between the intermediate network node and the fourth network node, and processing duration $T_5=t_5-t_4$ of the fourth network node from receiving the first data packet to sending the first data packet, and the intermediate network node may determine that the first duration $T_1=(T_2-T_3)-T_4-T_5=t_5-t_2-(t_4-t_3)-(t_5-t_4)=t_3-t_2$.

As shown in FIG. 5, when the first network node is the fourth network node, the first moment is $t_0$, the third moment is $t_4$, a moment at which the fourth network node sends the first data packet is $t_5$, the second duration $T_2=t_5-t_0$, the third duration $T_3=t_4-t_0$, and the fourth duration $T_4=t_5-t_4$. Therefore, the first duration $T_1 \leq T_2-(t_4-t_0)=t_5-t_4$, or the first duration $T_1 \leq T_2-T_3=t_5-t_4$, or the first duration $T_1 \leq T_4=t_5-t_4$.

It should be understood that, in this embodiment of this application, an architecture of the communications network is described only by using a case in which the communications network includes one first network node, two first network nodes, and three first network nodes. The communications network may further include more than three first network nodes, that is, include a plurality of intermediate network nodes. This is not limited in this embodiment of this application.

Optionally, when the communications network includes more than three first network nodes, a manner in which the first network node determines the first duration is similar to that when the communications network includes three first network nodes. To avoid repetition, details are not described herein again.

Specifically, S230 may be that the first network node determines the first duration based on the first indication information; and the first network node sends the first data packet based on the first duration.

Optionally, that the first network node sends the first data packet based on the first duration may be that the first network node sends the first data packet within a range of the first duration. That is, determinism of transmitting the first data packet within the first duration is ensured.

In an optional embodiment, the first network node can complete processing of the first data packet and send the first data packet before an end moment of the first duration.

In another optional embodiment, the first network node can send the first data packet at an end moment of the first duration. In other words, if the first network node completes processing of the first data packet before the end moment of the first duration, the first network node can first store the first data packet, and send the first data packet until the end moment of the first duration.

For example, the first network node can start a timer after receiving the first data packet. Duration of the timer is the first duration, and when the timer expires, the first network node sends the first data packet.

According to the data transmission method provided in this embodiment of this application, the first network node in the communications network sends the first data packet based on the first duration in the first indication information. This helps ensure that the communications network transmits the first data packet based on a duration requirement.

Optionally, the first duration in this embodiment of this application may alternatively include transmission duration of transmitting the first data packet by the first network node.

In an optional embodiment, when the first network node is not the fourth network node, the transmission duration includes duration starting from sending the first data packet by the first network node to receiving the first data packet by a next-hop network node or correctly receiving the first data packet.

In another optional embodiment, when the first network node is the fourth network node, the transmission duration includes duration starting from sending the first data packet by the fourth network node to receiving the first data packet by another network node in a service network or correctly receiving the first data packet.

Optionally, the first indication information may alternatively include at least one of a duration threshold and a duration jitter. The duration threshold may include an upper duration limit and/or a lower duration limit. This is not limited in this embodiment of this application.

In an optional embodiment, that the first network node sends the first data packet based on the first duration may be that the first network node sends the first data packet based on the first duration and the at least one of the duration threshold and the duration jitter.

In other words, the first network node sends the first data packet within an allowable duration threshold range of the first duration, or within an allowable duration jitter range of the first duration.

In another optional embodiment, that the first network node sends the first data packet based on the second duration and the first time parameter may be that the first network node sends the first data packet based on the second duration, the first time parameter, and the at least one of the duration threshold and the duration jitter.

In other words, the first network node sends the first data packet within the allowable duration threshold range of the second duration, or within an allowable duration jitter range of the second duration.

Optionally, before S230, the method 200 further includes: obtaining, by the first network node, deterministic transmission indication information, where the deterministic transmission indication information is used to indicate deterministic transmission performed on a first data flow by the first network node, that is, indicate that the first network node transmits a data packet in the first data flow based on a requirement of the first duration, and the first data flow includes the first data packet. Correspondingly, S230 may be that the first network node sends the first data packet based on the first duration and the deterministic transmission indication information.

Optionally, because the communications network has a relatively high delay requirement of the first data packet, if the first data packet is transmitted based on a duration requirement indicated by the second network node, the first data packet may be invalid or expired. Therefore, when the first network node determines that the first data packet cannot be sent within the first duration requirement, the first network node may discard the first data packet, or the first network node may indicate, to the second network node, duration that is supported by the first network node and that is from receiving the first data packet to sending the first data packet, indicate that transmission is unsuccessful, and so on. This is not limited in this embodiment of this application.

Optionally, the deterministic transmission indication information may explicitly instruct the first network node to perform deterministic transmission on the first data flow, or implicitly instruct the first network node to perform deterministic transmission on the first data flow. This is not limited in this embodiment of this application.

In an explicit indication manner, the deterministic transmission indication information is at least one bit, and the at least one bit is used to instruct the first network node to perform deterministic transmission on the first data flow.

For example, when the at least one bit is 1 bit, that 1 bit is "0" indicates that the first network node does not perform deterministic transmission on the first data flow; and that 1 bit is "1" indicates that the first network node performs deterministic transmission on the first data flow.

For another example, when the at least one bit exists, the first network node is instructed to perform deterministic transmission on the first data flow; or when the at least one bit does not exist, the first network node is instructed not to perform deterministic transmission on the first data flow.

In an implicit indication manner, the deterministic transmission indication information is an identifier of the first data flow, or the deterministic transmission indication information is the first duration.

Optionally, the first network node may obtain the deterministic transmission indication information in a plurality of manners. This is not limited in this embodiment of this application.

In an optional embodiment, the first network node may obtain the deterministic transmission indication information carried in the first indication information.

In another optional embodiment, the first network node may receive third indication information, and obtain the deterministic transmission indication information based on the deterministic transmission indication information included in the third indication information.

Optionally, when the deterministic transmission indication information is not the identifier of the first data flow, the first indication information or the third indication alternatively includes the identifier of the first data flow.

Optionally, the first network node may transmit a data packet in at least one data flow, and the at least one data flow includes the first data flow.

It should be understood that the data flow in this embodiment of this application is a data packet set including one or at least two data packets, and is a logical concept. Data packets belonging to a same data flow have a same or similar feature.

Optionally, data packets having a same transmit end and a receive end, for example, data packets having a same internet protocol (IP) address, or data packets having a same or similar transmission duration requirement, or data packets having a same data flow identifier, may belong to one data flow.

Optionally, the identifier of the data flow may be an identifier of a bearer in which the data flow is located, an identifier of a transmit end and/or a receive end of the data flow, an identifier of a terminal device, an identifier that is allocated to the data flow in the communications network and that is used to distinguish the data flow in the communications network, or the like. This is not limited in this embodiment of this application.

According to the data transmission method provided in this embodiment of this application, the deterministic transmission indication information includes the identifier of the data flow, so that when the communications network has a plurality of data flows that have different transmission duration requirements, the first network node can distinguish between different data flows, and ensure that the communications network transmits a data packet in each data flow based on a duration requirement of each data flow.

Optionally, the first data flow includes at least two data packets transmitted at a first transmission period, the at least two data packets include the first data packet, and the first indication information further includes information about the first transmission period.

Optionally, that the first network node obtains the first time parameter may be that the first network node obtains a second time parameter, where the second time parameter indicates a second moment, the second moment is a moment at which the third network node receives a second data packet, and the second data packet is the first transmitted data packet in the at least two data packets.

Optionally, the first network node may determine the first moment based on the second moment and the first transmission period.

According to the data transmission method provided in this embodiment of this application, the second time parameter may be carried only in the second data packet. In other words, a data packet in the at least two data packets other than the second data packet sent at the first transmission period does not need to carry the second time parameter or the first time parameter, so that transmission overheads can be reduced.

Optionally, the first network node may obtain the first time parameter in a plurality of manners. This is not limited in this embodiment of this application.

In an optional embodiment, the first network node may obtain the first time parameter carried in the first data packet.

Optionally, the first time parameter may be included in header information of a protocol data unit (PDU) layer, or the first time parameter may be included in two headers of transmission protocols of the first network node, for example, a header of an internet protocol (IP) or an Ethernet frame, or a header of user data protocol (UDP) or a general packet radio service (GPRS) tunneling protocol (GPRS turning protocol, GTP). When the first network node transmits a data packet by using a radio interface, the first time parameter may be further included in a header of a radio protocol stack, for example, a service data adaptation protocol (SDAP) layer, a packet data convergence protocol (PDCP), a radio link control (in a header of an RLC) layer, or a media access control (MAC) layer. Optionally, the first time parameter may alternatively be included in channel associated signaling of the data packet.

In another optional embodiment, the first network node may receive second indication information sent by the second network node, and the second indication information includes information about the first time parameter, and the first network node obtains the first time parameter from the second indication information.

For example, the first network node may receive the second indication information sent by a previous-hop network node of the first network node.

Optionally, before S230, the first network node may receive a transmission parameter that is sent by the second network node and that is used when the data packet in the first data flow is transmitted. The transmission parameter includes at least one activation identifier, at least one type of transmission periods activated by the at least one activation identifier, and an identifier of a data packet sent at each of the at least one type of transmission periods, and the at least one type of transmission periods includes the first transmission period; and Correspondingly, S230 may be that the first network node sends the first data packet based on the first indication information and the second indication information.

Optionally, the first data flow may include a data packet transmitted by using one type of transmission periods or a plurality of types of transmission periods.

Optionally, the at least one activation identifier may activate one type of transmission periods or a plurality of types of transmission periods. This is not limited in this embodiment of this application.

Optionally, when a quantity of the at least one transmission period is 1, an identifier of the data packet sent at the transmission period may be an identifier of the first data flow. When the quantity of the at least one transmission period is greater than 1, the identifier of the data packet sent at each of the plurality of types of transmission periods may be an identifier used to distinguish between data packets of different transmission periods. This is not limited in this embodiment of this application.

Optionally, the transmission parameter may further include information about a time-frequency resource used by the data packet sent at each type of transmission periods and/or information about a modulation and coding scheme (MCS) of the data packet sent at each type of transmission periods.

Optionally, when there are a plurality of types of quantities of the at least one type of transmission periods, and a sending time point of a second data packet sent by using a second transmission period overlaps a sending time point of a third data packet sent by using a third transmission period (that is, a time-frequency resource of the second data packet collides with a time-frequency resource of the third data packet), the transmission parameter may further include information about a target time-frequency resource used to transmit the second data packet and the third data packet and/or information about a target MCS used to transmit the second data packet and the third data packet. The second transmission period and the third transmission period are any two types of a plurality of types of transmission periods. This is not limited in this embodiment of this application.

Optionally, the transmission parameter may further include a validity period or validity duration of the activation identifier.

Optionally, the transmission parameter may further include at least one deactivation identifier, information about at least one type of transmission periods deactivated by the at least one deactivation identifier, and an identifier of a data packet sent at each of the at least one type of deactivated transmission periods.

Optionally, the at least one deactivation identifier may deactivate one type of transmission periods or a plurality of types of transmission periods. This is not limited in this embodiment of this application.

Optionally, the transmission parameter may further include other scheduling information used to schedule the data packet in the first data flow. This is not limited in this embodiment of this application.

Optionally, obtaining manners of information in the transmission parameter may be the same or may be different. This is not limited in this embodiment of this application.

For example, the first network node may obtain the transmission parameter carried in the first indication information. Alternatively, other indication information may be received, and the other indication information carries the transmission parameter.

For another example, the first network node may receive scheduling information sent by the second network node, and the scheduling information carries information about a time-frequency resource used by a data packet sent at each type of transmission periods and/or information about an MCS used by an activated data packet sent at each type of transmission periods.

For another example, the first network node may obtain information about a time-frequency resource used to transmit the second data packet at the first transmission period, and determine, based on the first transmission period and the time-frequency resource used to transmit the second data packet, information about a time-frequency resource used to send each data packet at the first transmission period.

Optionally, when air interface transmission is performed between the first network node and the second network node, the second network node may send the transmission parameter to the first network node.

According to the data transmission method provided in this embodiment of this application, the first network node may learn of, based on the transmission parameter, a type of transmission periods or types of transmission periods that are activated, data packets that are transmitted at each type of activated transmission periods, and a time-frequency resource and an MCS that are used to transmit these data packets. Therefore, the first network node does not need to request scheduling information from the second network node when sending each data packet, thereby reducing signaling overheads.

Optionally, the method 200 further includes: reporting, by the first network node, transmission capability information to the second network node, where the transmission capability information includes at least one of a data transmission volume supported by the first network node, a transmission rate supported by the first network node, transmission reliability supported by the first network node, and duration that is supported by the first network node and that is from receiving the first data packet by the first network node to sending the first data packet by the first network node. Correspondingly, the second network node may receive the transmission capability information reported by the first network node, and determine the first indication information of the first network node based on the transmission capability information.

Optionally, the data transmission volume supported by the first network node, the transmission rate supported by the first network node, the transmission reliability supported by the first network node, and the duration that is supported by the first network node and that is from receiving the first data packet by the first network node to sending the first data packet by the first network node may be: in a current environment or in a current configuration of the first network node, a maximum volume of transmitted data, a maximum transmission rate, maximum reliability, and shortest duration from receiving the first data packet by the first network node to sending the first data packet by the first network node. This is not limited in this embodiment of this application.

Optionally, the first network node may periodically report the transmission capability information to the second network node. Alternatively, the first network node may report the transmission capability information to the second network node by triggering a first event. An occasion on which the first network node reports the transmission capability information is not limited in this embodiment of this application.

The first event may be that the first network node receives a transmission capability information request sent by the second network node, or the first event may be that the first network node completes sending of the first data packet. This is not limited in this embodiment of this application.

Optionally, the method 200 further includes: sending, by the first network node, transmission response information to the second network node, where the transmission response information is used to feed back that transmission capability of the first network node can reach the first duration indicated by the first indication information, or the transmission response information is used to feed back that transmission capability of the first network node cannot reach the first duration, or the transmission response information is used to feed back the transmission capability information supported by the first network node.

Correspondingly, the sending, by the first network node, the first data packet based on the first duration includes: sending, by the first network node, the first data packet based on the first duration when the transmission capability of the first network node can reach the first duration.

Optionally, this embodiment of this application may be applied to an uplink transmission scenario or a downlink transmission scenario. This is not limited in this embodiment of this application.

Specifically, in the uplink transmission scenario, that the first network node sends the first data packet may be understood as that the first network node sends the first data packet in an uplink direction. In the downlink transmission scenario, that the first network node sends the first data packet may be understood as that the first network node sends the first data packet in a downlink direction.

Figure 6:
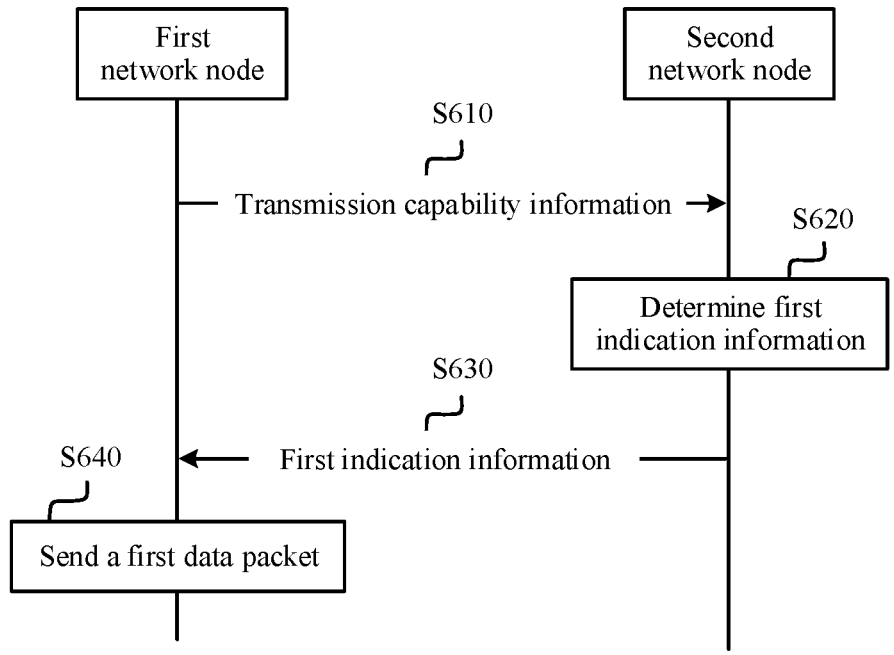
FIG. 6 is a schematic flowchart of another data transmission method according to an embodiment of this application.

FIG. 6 is a schematic flowchart of another data transmission method 600 according to an embodiment of this application. The method 600 may be applied to, for example, the communications network shown in FIG. 1.

S610. A first network node reports transmission capability information to a second network node, where the transmission capability information includes at least one of a data transmission volume supported by the first network node, a transmission rate supported by the first network node, transmission reliability supported by the first network node, and duration that is supported by the first network node and that is from receiving the first data packet by the first network node to sending the first data packet by the first network node. Correspondingly, the second network node receives the transmission capability information sent by the first network node.

Optionally, the data transmission volume supported by the first network node, the transmission rate supported by the first network node, the transmission reliability supported by the first network node, and the duration that is supported by the first network node and that is from receiving the first data packet by the first network node to sending the first data packet by the first network node may be: in a current environment or in a current configuration of the first network node, a maximum volume of transmitted data, a maximum transmission rate, maximum reliability, and shortest duration from receiving the first data packet by the first network node to sending the first data packet by the first network node. This is not limited in this embodiment of this application.

Optionally, the first network node may periodically report the transmission capability information to the second network node. Alternatively, the first network node may report the transmission capability information to the second network node by triggering a first event. An occasion on which the first network node reports the transmission capability information is not limited in this embodiment of this application.

The first event may be that the first network node receives a transmission capability information request sent by the second network node, or the first event may be that the first network node completes sending of the first data packet. This is not limited in this embodiment of this application.

S620. The second network node determines the first indication information based on the transmission capability information, where the first indication information is used by the first network node to determine first duration, and the first duration is from receiving the first data packet by the first network node to sending the first data packet by the first network node. Correspondingly, the first network node receives the first indication information sent by the second network node.

S630. The second network node sends the first indication information to the first network node; and correspondingly, the first network node receives the first indication information.

S640. The first network node sends the first data packet based on the first indication information.

Specifically, the first network node may determine the first duration based on the first indication information; and the first network node sends the first data packet based on the first duration.

Optionally, the sending, by the first network node, the first data packet based on the first duration may be: sending, by the first network node, the first data packet before an end moment of the first duration, or sending, by the first network node, the first data packet at an end moment of the first duration. This is not limited in this embodiment of this application.

Optionally, the first indication information further includes deterministic transmission indication information. The deterministic transmission indication information is used to indicate deterministic transmission performed on a first data flow by the first network node, that is, indicate that the first network node transmits a data packet in the first data flow based on a requirement of the first duration, and the first data flow includes the first data packet.

Correspondingly, the first network node sends the first data packet based on the first duration and the deterministic transmission indication information.

Optionally, when the first network node determines that the first data packet cannot be sent within a first duration requirement, the first network node may discard the first data packet, or the first network node may indicate, to a transmit end, duration that is supported by the first network node and that is from receiving the first data packet to sending the first data packet, indicate that transmission is unsuccessful, and so on. This is not limited in this embodiment of this application.

It should be understood that a data flow in this embodiment of this application is a data packet set including one or more data packets, and is a logical concept. Data packets belonging to a same data flow have a same or similar feature.

Optionally, data packets having a same transmit end and a receive end, for example, data packets having a same internet protocol (IP) address, or data packets having a same or similar transmission duration requirement, may belong to one data flow.

Optionally, the identifier of the data flow may be an identifier of a bearer in which the data flow is located, an identifier of a transmit end and/or a receive end of the data flow, an identifier of a terminal device, an identifier that is allocated to the data flow in the communications network and that is used to distinguish the data flow in the communications network, or the like. This is not limited in this embodiment of this application.

The foregoing describes in detail the data transmission methods provided in the embodiments of this application with reference to FIG. 1 to FIG. 6. The following describes data transmission apparatuses provided in the embodiments of this application with reference to FIG. 7 to FIG. 10.

Figure 7:
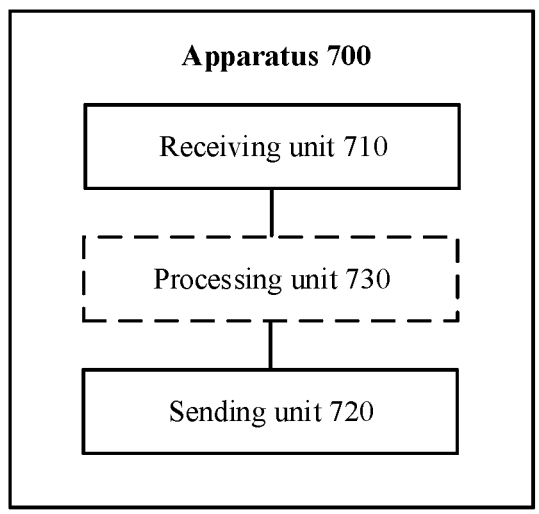
FIG. 7 is a schematic block diagram of a data transmission apparatus according to an embodiment of this application.

FIG. 7 is a schematic block diagram of a data transmission apparatus 700 according to an embodiment of this application. The apparatus 700 includes:

a receiving unit 710, configured to receive first indication information sent by a second network node, where the first indication information is used to determine first duration, and the first duration is duration from receiving a first data packet by the apparatus to sending the first data packet by the apparatus; and a sending unit 720, configured to send the first data packet based on the first indication information received by the receiving unit.

Optionally, the apparatus 700 further includes a processing unit 730. The processing unit is configured to determine the first duration based on the first indication information received by the receiving unit; and the sending unit is specifically configured to send the first data packet based on the first duration determined by the processing unit.

Optionally, the first data packet is a data packet in a first data flow, and the first indication information includes an identifier of the first data flow.

Optionally, the first indication information includes value information of the first duration.

Optionally, the first indication information includes value information of second duration, the second duration is duration from receiving the first data packet by a third network node to sending the first data packet by a fourth network node, the third network node is a network node that first transmits the first data packet in a communications network, the fourth network node is a network node that last transmits the first data packet in the communications network, and the communications network includes the apparatus and the second network node; and the apparatus further includes an obtaining unit, where the obtaining unit is configured to obtain a first time parameter before the first data packet is sent based on the first indication information, where the first time parameter indicates a first moment or third duration, the first moment is a moment at which the third network node receives the first data packet, and the third duration is duration from receiving the first data packet by the third network node to receiving the first data packet by the apparatus; and the sending unit is specifically configured to send the first data packet based on the first indication information and the first time parameter.

Optionally, the obtaining unit is configured to obtain the first time parameter carried in the first data packet; or the receiving unit is further configured to receive second indication information, where the second indication information includes the first time parameter; and the obtaining unit is configured to obtain the first time parameter from the second indication information.

Optionally, the first data flow includes at least two data packets transmitted at a first transmission period, the at least two data packets include the first data packet, and the first indication information further includes information about the first transmission period.

Optionally, when the first time parameter indicates the first moment, the obtaining unit is further configured to obtain a second time parameter, where the second time parameter indicates a second moment, the second moment is a moment at which the third network node receives a second data packet, and the second data packet is the first transmitted data packet in the at least two data packets; and the processing unit is configured to obtain the first time parameter based on the second moment and the first transmission period.

Optionally, the first data packet is a data packet in the first data flow, and the obtaining unit is further configured to obtain, before the first data packet is sent based on the first indication information, a transmission parameter used when the data packet in the first data flow is transmitted, where the transmission parameter includes at least one activation identifier, at least one type of transmission periods activated by the at least one activation identifier, and an identifier of a data packet sent at each type of transmission periods in the at least one type of transmission periods, and the at least one type of transmission periods includes the first transmission period; and the sending unit is specifically configured to send the first data packet based on the first indication information and the transmission parameter.

Optionally, the sending unit is further configured to report transmission capability information to the second network node, where the transmission capability information includes at least one of a data transmission volume supported by the apparatus, a transmission rate supported by the apparatus, transmission reliability supported by the apparatus, and duration that is supported by the apparatus and that is from receiving the first data packet by the apparatus to sending the first data packet by the apparatus.

Optionally, the first indication information includes at least one of a duration threshold and a duration jitter.

It should be understood that, the apparatus 700 herein is presented in a form of function unit. The term "unit" herein may refer to an application-specific integrated circuit (ASIC), an electronic circuit, a processor (for example, a shared processor, a special-purpose processor, or a group processor) configured to execute one or more software or firmware programs, a memory, a combinational logic circuit, and/or another suitable component that supports the described function. In an optional example, a person skilled in the art may understand that, the apparatus 700 may be specifically the first network node in the embodiments of the method 200 and the method 600, and the apparatus 700 may be configured to perform each procedure and/or step corresponding to the first network node in the embodiments of the method 200 and the method 600. To avoid repetition, details are not described herein again.

Figure 8:
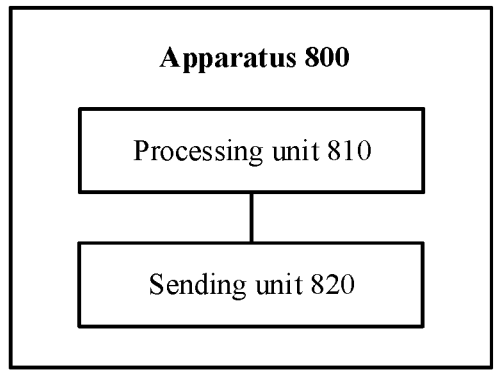
FIG. 8 is a schematic block diagram of another data transmission apparatus according to an embodiment of this application.

FIG. 8 is a schematic flowchart of a data transmission apparatus 1200 according to an embodiment of this application. The apparatus 1300 includes:

a processing unit 810, configured to determine first indication information, where the first indication information is used to determine first duration, and the first duration is duration from receiving a first data packet by a first network node to sending the first data packet by the first network node; and a sending unit 820, configured to send the first indication information to the first network node.

Optionally, the first data packet is a data packet in a first data flow, and the first indication information includes an identifier of the first data flow.

Optionally, the first indication information includes value information of the first duration.

Optionally, the first indication information includes value information of second duration, the second duration is duration from receiving the first data packet by a third network node to sending the first data packet by a fourth network node, the third network node is a network node that first transmits the first data packet in a communications network, the fourth network node is a network node that last transmits the first data packet in the communications network, and the communications network includes the apparatus and the second network node.

Optionally, the first data flow includes at least two data packets transmitted at a first transmission period, the at least two data packets include the first data packet, and the first indication information further includes information about the first transmission period.

Optionally, the first data packet is a data packet in the first data flow, the first information further includes a transmission parameter used when the data packet in the first data flow is transmitted, the transmission parameter includes at least one activation identifier, at least one transmission period activated by the at least one activation identifier, and an identifier of a data packet sent at each of the at least one transmission period, and the at least one transmission period includes the first transmission period.

Optionally, the first indication information includes at least one of a duration threshold and a duration jitter.

Optionally, the apparatus further includes: a receiving unit, where the receiving unit is configured to receive transmission capability information reported by the first network node, where the transmission capability information includes at least one of a data transmission volume supported by the first network node, a transmission rate supported by the first network node, transmission reliability supported by the first network node, and duration that is supported by the first network node and that is from receiving the first data packet by the first network node to sending the first data packet by the first network node; and the processing unit is specifically configured to determine the first indication information based on the transmission capability information.

It should be understood that, the apparatus 800 herein is presented in a form of function unit. Herein the term "unit" may be an ASIC, an electronic circuit, a processor (for example, a shared processor, a special-purpose processor, or a group processor) configured to execute one or more software or firmware programs, a memory, a combinational logic circuit, and/or another appropriate component that supports the described function. In an optional example, a person skilled in the art may understand that, the apparatus 800 may be specifically the second network node in the embodiments of the method 200 and the method 600, and the apparatus 800 may be configured to perform each procedure and/or step corresponding to the second network node in the embodiments of the method 200 and the method 600. To avoid repetition, details are not described herein again.

Figure 9:
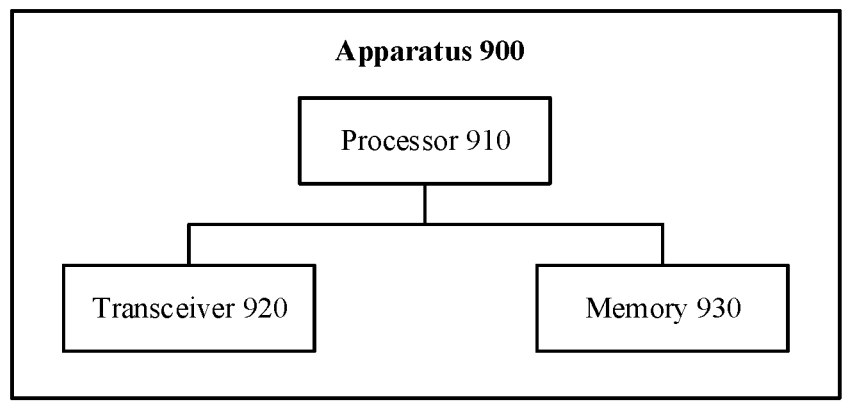
FIG. 9 is a schematic block diagram of still another data transmission apparatus according to an embodiment of this application.

FIG. 9 shows a data transmission apparatus 900 according to an embodiment of this application. The apparatus 900 may be the first network node in FIG. 1 and FIG. 2. The apparatus 900 may use a hardware architecture shown in FIG. 9. The apparatus may include a processor 910, a transceiver 920, and a memory 930. The processor 910, the transceiver 920, and the memory 930 communicate with each other by using an internal connection path. Related functions implemented by the processing unit 730 in FIG. 7 may be implemented by the processor 910, and related functions implemented by the sending unit 720 and the receiving unit 710 may be implemented by the processor 910 by controlling the transceiver 920.

The processor 910 may include one or more processors, for example, include one or more central processing units (CPU). When the processor is one CPU, the CPU may be a single-core CPU or a multi-core CPU.

The transceiver 920 is configured to send and receive data and/or a signal, and receive data and/or a signal. The transceiver may include a transmitter and a receiver. The transmitter is configured to send data and/or a signal, and the receiver is configured to receive data and/or a signal.

The memory 930 includes but is not limited to a random access memory (random access memory, RAM), a read-only memory (ROM), an erasable programmable memory (EPROM), and a compact disc read-only memory (CD-ROM). The memory 930 is configured to store a related instruction and data.

The memory 930 is configured to store program code and data of the apparatus, and may be a separate device or may be integrated into the processor 910.

Specifically, the processor 910 is configured to control the transceiver to perform information transmission with a second network node. For details, refer to the descriptions in the foregoing method embodiments. Details are not described herein again.

It can be understood that FIG. 9 shows only a simplified design of the apparatus. During actual application, the apparatus may further include other necessary components, including but not limited to any quantity of transceivers, processors, controllers, memories, and the like, and all apparatuses that can implement this application shall fall within the protection scope of this application.

In a possible design, the apparatus 900 may be replaced with a chip apparatus, for example, may be a communications chip that can be used in the apparatus, and is configured to implement related functions of the processor 910 in the apparatus. The chip apparatus may be a field programmable gate array, an application-specific integrated chip, a system on chip, a central processing unit, a network processor, a digital signal processing circuit, a microcontroller, a programmable controller, or another integrated chip for implementing related functions. Optionally, the chip may include one or more memories, configured to store program code. When the code is executed, the processor is enabled to implement corresponding functions.

Figure 10:
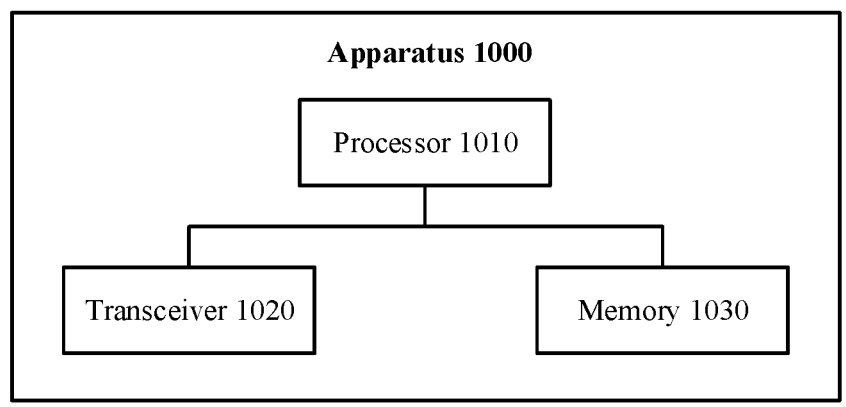
FIG. 10 is a schematic block diagram of still another data transmission apparatus according to an embodiment of this application.

FIG. 10 shows an apparatus 1000 according to an embodiment of this application. The apparatus 1000 may be the second network node in FIG. 1 and FIG. 2. The apparatus 1000 may use a hardware architecture shown in FIG. 10. The apparatus may include a processor 1010, a transceiver 1020, and a memory 1030. The processor 1010, the transceiver 1020, and the memory 1030 communicate with each other by using an internal connection path. Related functions implemented by the processing unit 810 in FIG. 8 may be implemented by the processor 1010, and related functions implemented by the sending unit 820 may be implemented by the processor 1010 by controlling the transceiver 1020.

The processor 1010 may include one or more processors, for example, include one or more CPUs. When the processor is one CPU, the CPU may be a single-core CPU or a multi-core CPU.

The transceiver 1020 is configured to send and receive data and/or a signal, and receive data and/or a signal. The transceiver may include a transmitter and a receiver. The transmitter is configured to send data and/or a signal, and the receiver is configured to receive data and/or a signal.

The memory 1030 includes but is not limited to a RAM, a ROM, an EPROM, and a CD-ROM. The memory 1030 is configured to store a related instruction and data.

The memory 1030 is configured to store program code and data of the apparatus, and may be a separate device or may be integrated into the processor 1010.

Specifically, the processor 1010 is configured to control the transceiver to perform information transmission with a first network node. For details, refer to the descriptions in the foregoing method embodiments. Details are not described herein again.

It can be understood that FIG. 10 shows only a simplified design of the apparatus. During actual application, the apparatus may further include other necessary components, including but not limited to any quantity of transceivers, processors, controllers, memories, and the like, and all apparatuses that can implement this application shall fall within the protection scope of this application.

In a possible design, the apparatus 1000 may be replaced with a chip apparatus, for example, may be a communications chip that can be used in the apparatus, and is configured to implement related functions of the processor 1010 in the apparatus. The chip apparatus may be a field programmable gate array, an application-specific integrated chip, a system on chip, a central processing unit, a network processor, a digital signal processing circuit, a microcontroller, a programmable controller, or another integrated chip for implementing related functions. Optionally, the chip may include one or more memories, configured to store program code. When the code is executed, the processor is enabled to implement corresponding functions.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A data transmission method comprising:
receiving, by a first network node, first indication information sent by a second network node, wherein the first network node is configured to determine a first duration based on the first indication information, and the first duration is a duration from receiving a first data packet by the first network node to sending the first data packet by the first network node; and
sending, by the first network node, the first data packet based on the first indication information;
wherein the first indication information comprises value information of a second duration, the second duration being a duration from receiving the first data packet by a third network node to sending the first data packet by a fourth network node,
wherein the third network node is configured to first transmit the first data packet in a communications network, and the fourth network node is configured to last transmit the first data packet in the communications network, and the communications network comprises the first network node and the second network node,
wherein the method further comprises: before the sending, by the first network node, the first data packet based on the first indication information, obtaining, by the first network node, a first time parameter, wherein the first time parameter indicates a first moment or a third duration, the first moment being a moment at which the third network node receives the first data packet, the third duration being a duration from receiving the first data packet by the third network node to receiving the first data packet by the first network node,
wherein the sending, by the first network node, the first data packet based on the first indication information comprises sending, by the first network node, the first data packet based on the first indication information and the first time parameter,
wherein the first data packet is a data packet in a first data flow, and
wherein the first data flow comprises at least two data packets transmitted in a first transmission period, the at least two data packets comprise the first data packet, and the first indication information further comprises information about the first transmission period.

2. The method according to claim 1, wherein the first indication information comprises an identifier of the first data flow.

3. The method according to claim 1, wherein the first indication information comprises value information of the first duration.

4. The method according to claim 1, wherein the obtaining, by the first network node, a first time parameter comprises at least one of:
obtaining, by the first network node, the first time parameter carried in the first data packet; or
receiving, by the first network node, second indication information that comprises information about the first time parameter, and obtaining, by the first network node, the first time parameter from the second indication information.

5. The method according to claim 1, wherein the first time parameter indicates the first moment, and
wherein the obtaining, by the first network node, a first time parameter comprises:
obtaining, by the first network node, a second time parameter, wherein the second time parameter indicates a second moment, the second moment is a moment at which the third network node receives a second data packet, and the second data packet is a first transmitted data packet in the at least two data packets; and
determining, by the first network node, the first time parameter based on the second moment and the first transmission period.

6. The method according to claim 1,
wherein, before the sending, by the first network node, the first data packet based on the first indication information, the method further comprises:

obtaining, by the first network node, a transmission parameter used when the data packet in the first data flow is transmitted, wherein the transmission parameter comprises at least one of: at least one activation identifier, at least one type of transmission periods activated by the at least one activation identifier, or an identifier of a respective data packet sent at each of the at least one type of transmission periods, and wherein the at least one type of transmission periods comprises a first transmission period in which at least two data packets including the first data packet are transmitted, and wherein the sending, by the first network node, the first data packet based on the first indication information comprises:

sending, by the first network node, the first data packet based on the first indication information and the transmission parameter.

7. The method according to claim 1, wherein the method further comprises:

reporting, by the first network node, transmission capability information to the second network node, wherein the transmission capability information comprises at least one of a data transmission volume supported by the first network node, a transmission rate supported by the first network node, transmission reliability supported by the first network node, or a duration that is supported by the first network node and that is from receiving the first data packet by the first network node to sending the first data packet by the first network node.

8. The method according to claim 1, wherein the first indication information comprises at least one of a duration threshold or a duration jitter.

9. A data transmission method comprising:

determining, by a second network node, first indication information, wherein a first duration is determined based on the first indication information, and the first duration is a duration from receiving a first data packet by a first network node to sending the first data packet by the first network node; and sending, by the second network node, the first indication information to the first network node, wherein the first indication information comprises value information of a second duration, the second duration being a duration from receiving the first data packet by a third network node to sending the first data packet by a fourth network node, wherein the third network node is configured to first transmit the first data packet in a communications network, and the fourth network node is configured to last transmit the first data packet in the communications network, and the communications network comprises the first network node and the second network node, wherein before the sending the first data packet by the first network node, the first network node is configured to obtain a first time parameter, wherein the first time parameter indicates a first moment or a third duration, the first moment being a moment at which the third network node receives the first data packet, the third duration being a duration from receiving the first data packet by the third network node to receiving the first data packet by the first network node, wherein the sending the first data packet by the first network node comprises sending the first data packet by the first network node based on the first indication information and the first time parameter, wherein the first data packet is a data packet in a first data flow, and wherein the first data flow comprises at least two data packets transmitted in a first transmission period, the at least two data packets comprise the first data packet, and the first indication information further comprises information about the first transmission period.

10. The method according to claim 9, wherein the method further comprises:

receiving, by the second network node, transmission capability information reported by the first network node, wherein the transmission capability information comprises at least one of a data transmission volume supported by the first network node, a transmission rate supported by the first network node, transmission reliability supported by the first network node, or a duration that is supported by the first network node and that is from receiving the first data packet by the first network node to sending the first data packet by the first network node, and wherein the determining, by a second network node, first indication information of the first network node comprises:

determining, by the second network node, the first indication information based on the transmission capability information.

11. A data transmission apparatus comprising:

at least one processor; and at least one non-transitory computer-readable storage medium coupled to the at least one processor and storing programming instructions for execution by the at least one processor, wherein the programming instructions instruct the at least one processor to perform operations comprising:

receiving first indication information sent by a second network node, wherein a first duration is determined based on the first indication information, and the first duration is a duration from receiving a first data packet by the apparatus to sending the first data packet by the apparatus; and sending the first data packet based on the first indication information, wherein the first indication information comprises value information of the first duration and value information of a second duration, the second duration being a duration from receiving the first data packet by a third network node to sending the first data packet by a fourth network node, wherein the third network node is configured to first transmit the first data packet in a communications network, the fourth network node is configured to last transmit the first data packet in the communications network, and the communications network comprises the apparatus and the second network node, wherein the operations further comprise: before the sending the first data packet based on the first indication information, obtaining a first time parameter, wherein the first time parameter indicates a first moment or a third duration, the first moment being a moment at which the third network node receives the first data packet, the third duration being a duration from receiving the first data packet by the third network node to receiving the first data packet by apparatus, wherein the sending the first data packet based on the first indication information comprises sending the first data packet based on the first indication information based on the first indication information and the first time parameter, wherein the first data packet is a data packet in a first data flow, and wherein the first data flow comprises at least two data packets transmitted at a first transmission period, the at least two data packets comprise the first data packet, and the first indication information further comprises information about the first transmission period.

12. The apparatus according to claim 11, wherein the operations comprise at least one of:

obtaining the first time parameter carried in the first data packet; or receiving second indication information that comprises information about the first time parameter, and obtaining the first time parameter from the second indication information.

13. The apparatus according to claim 11, wherein the first time parameter indicates the first moment, and wherein the operations further comprise:

obtaining a second time parameter that indicates a second moment, wherein the second moment is a moment at which the third network node receives a second data packet, and the second data packet is a first transmitted data packet in the at least two data packets; and obtaining the first time parameter based on the second moment and the first transmission period.

14. The apparatus according to claim 11, wherein the operations comprise:

obtaining a transmission parameter used when the data packet in the first data flow is transmitted before the first data packet is sent based on the first indication information, wherein the transmission parameter comprises at least one of: at least one activation identifier, at least one type of transmission periods activated by the at least one activation identifier, or an identifier of a respective data packet sent at each of the at least one type of transmission periods, wherein the at least one type of transmission periods comprises a first transmission period in which at least two data packets including the first data packet are transmitted; and sending the first data packet based on the first indication information and the transmission parameter.

15. The apparatus according to claim 11, wherein the operations further comprise:

reporting transmission capability information to the second network node, wherein the transmission capability information comprises at least one of a data transmission volume supported by the apparatus, a transmission rate supported by the apparatus, transmission reliability supported by the apparatus, or a duration that is supported by the apparatus and that is from receiving the first data packet by the apparatus to sending the first data packet by the apparatus.

16. The apparatus according to claim 11, wherein the first indication information comprises at least one of a duration threshold or a duration jitter.

* * * * *